United States Patent
Weatherill et al.

(10) Patent No.: US 10,554,626 B2
(45) Date of Patent: Feb. 4, 2020

(54) FILTERING OF AUTHENTICATED SYNTHETIC TRANSACTIONS

(71) Applicant: International Business Machines Corporation, Armonk, NY (US)

(72) Inventors: Mark N. Weatherill, Victoria Park (AU); Andrew J. Bailey, Leederville (AU); Randy George, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 241 days.

(21) Appl. No.: 15/825,547

(22) Filed: Nov. 29, 2017

(65) Prior Publication Data

US 2019/0166094 A1    May 30, 2019

(51) Int. Cl.
*H04L 29/06*    (2006.01)

(52) U.S. Cl.
CPC ........ *H04L 63/029* (2013.01); *H04L 63/0236* (2013.01); *H04L 63/0245* (2013.01)

(58) Field of Classification Search
CPC ...................................................... H04L 63/29
USPC .............................................................. 726/11
See application file for complete search history.

(56) References Cited

U.S. PATENT DOCUMENTS

| | | | |
|---|---|---|---|
| 6,105,134 A * | 8/2000 | Pinder | H04L 63/04 348/E5.004 |
| 7,480,834 B2 | 1/2009 | Blaisdell et al. | |
| 7,624,176 B2 | 11/2009 | Dickerson et al. | |
| 8,326,971 B2 | 12/2012 | Dickerson et al. | |
| 8,489,720 B1 | 7/2013 | Morford et al. | |
| 8,943,497 B2 | 1/2015 | Ferris et al. | |
| 2004/0054680 A1* | 3/2004 | Kelley | H04L 41/046 |
| 2009/0144409 A1 | 6/2009 | Dickerson et al. | |
| 2009/0164270 A1* | 6/2009 | Seidman | G06Q 10/06 705/7.38 |
| 2011/0161395 A1 | 6/2011 | O'Donnell, III et al. | |

(Continued)

FOREIGN PATENT DOCUMENTS

WO    2015081307 A1    6/2015

OTHER PUBLICATIONS

IBM, "Cloudant: Pricing," https://www.ibm.com/cloud/cloudant/pricing, printed Nov. 9, 2017, 4 pgs.

(Continued)

*Primary Examiner* — Jacob Lipman
(74) *Attorney, Agent, or Firm* — Jay Wahlquist

(57) ABSTRACT

A method of filtering authenticated synthetic transactions comprises receiving over a network, at a server providing a first networked application, a plurality of requests for the first networked application, wherein the plurality of requests includes a first synthetic transaction. The method further comprises analyzing a respective header of each of the plurality of requests; identifying a synthetic token in the respective header of the first synthetic transaction in response to analyzing the respective header of each of the plurality of requests; determining that the identified synthetic token corresponds to the first networked application; and bypassing usage monitoring for the first synthetic transaction in response to determining that the identified synthetic token corresponds to the first networked application.

20 Claims, 6 Drawing Sheets

(56) References Cited

U.S. PATENT DOCUMENTS

2018/0047100 A1* 2/2018 Bonig ................ G06F 9/30043

OTHER PUBLICATIONS

IBM, "Getting Started with Availability Monitoring,"https://console.bluemix.net/docs/services/AvailabilityMonitoring/index.html#avmon_gettingstarted, printed Nov. 20, 2017, 3 pgs.

IBM, "IBM Application Performance Management portfolio adds hybrid monitoring capabilities with Bluemix, new on-premise synthetic monitoring, and extended monitoring coverage," Version 8.1.3,-01.ibm.com/common/ssi/ShowDoc.wss?docURL=/common/ssi/rep_ca/6/897/ENUS216-106/index.html&lang=en&request_locale=en, Apr. 26, 2016, 24 pgs.

Narayan et al., Smart Metering of Cloud Services, Systems Conference (SysCon), 2012 IEEE International, http://ieeexplore.ieee.org/document/6189462/, pp. 1-7.

Mell et al., "The NIST Definition of Cloud Computing," Recommendations of the National Institute of Standards and Technology, U.S. Department of Commerce, Special Publication 800-145, Sep. 2011, 7 pgs.

\* cited by examiner

FILTERING OF AUTHENTICATED SYNTHETIC TRANSACTIONS

BACKGROUND

Synthetic transaction monitoring is an approach used to monitor the performance and availability of services and applications. In conventional systems, performing periodic, synthetic transactions against these services can skew other monitored statistics. For example, in some systems the cost of the service is dependent on the amount of usage. In such cases, the periodic synthetic transactions inflate the monitored usage and can incur real costs to the user. Additionally, the inflated usage monitoring can make statistics less accurate for other purposes, such as determining if application usage meets expected levels or business plans.

SUMMARY

Aspects of the disclosure may include a computer implemented method, computer program product, and system for filtering authenticated synthetic transactions. The method comprises receiving over a network, at a server providing a first networked application, a plurality of requests for the first networked application, wherein the plurality of requests includes a first synthetic transaction. The method further comprises analyzing a respective header of each of the plurality of requests; identifying a synthetic token in the respective header of the first synthetic transaction in response to analyzing the respective header of each of the plurality of requests; determining that the identified synthetic token corresponds to the first networked application; and bypassing usage monitoring for the first synthetic transaction in response to determining that the identified synthetic token corresponds to the first networked application.

The above summary is not intended to describe each illustrated embodiment or every implementation of the present disclosure.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
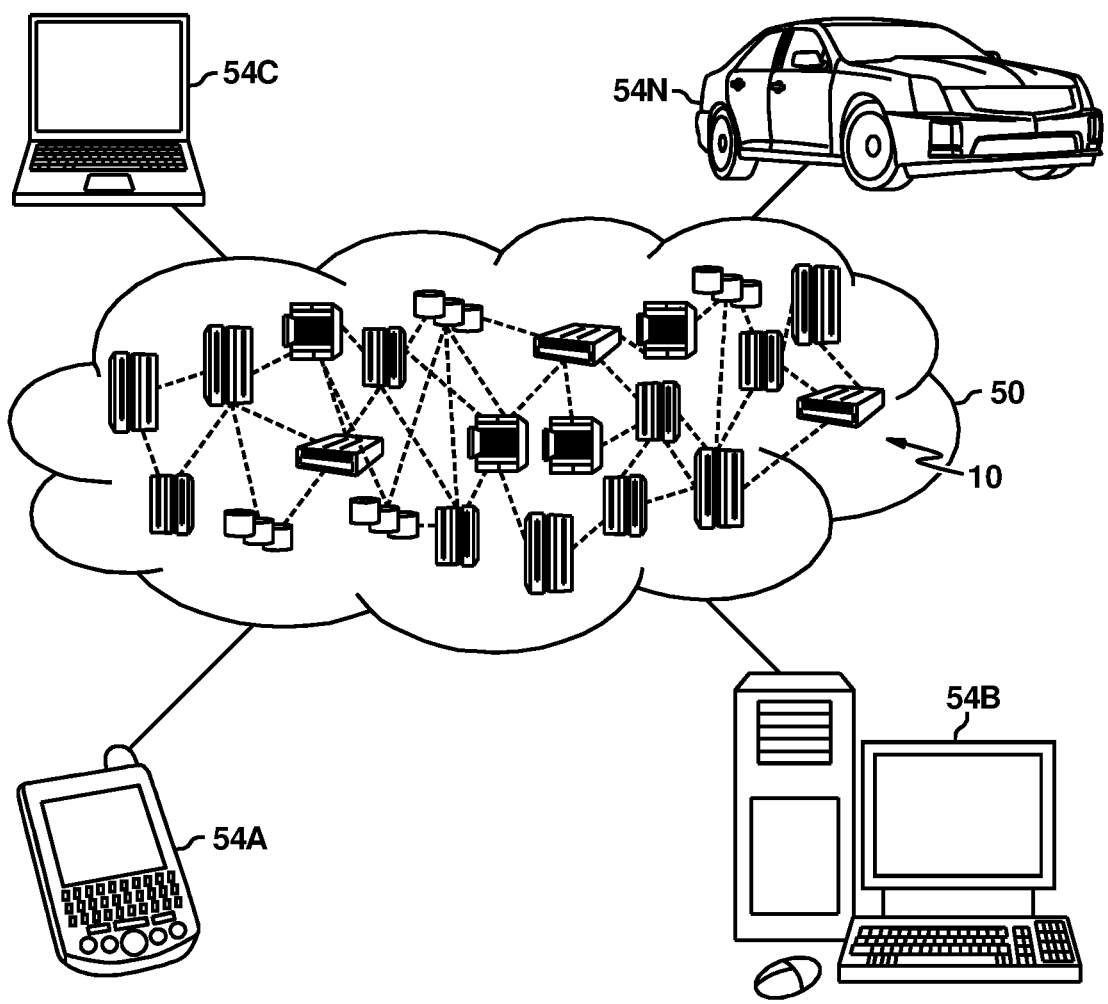
FIG. 1 depicts one embodiment of an example cloud computing environment.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
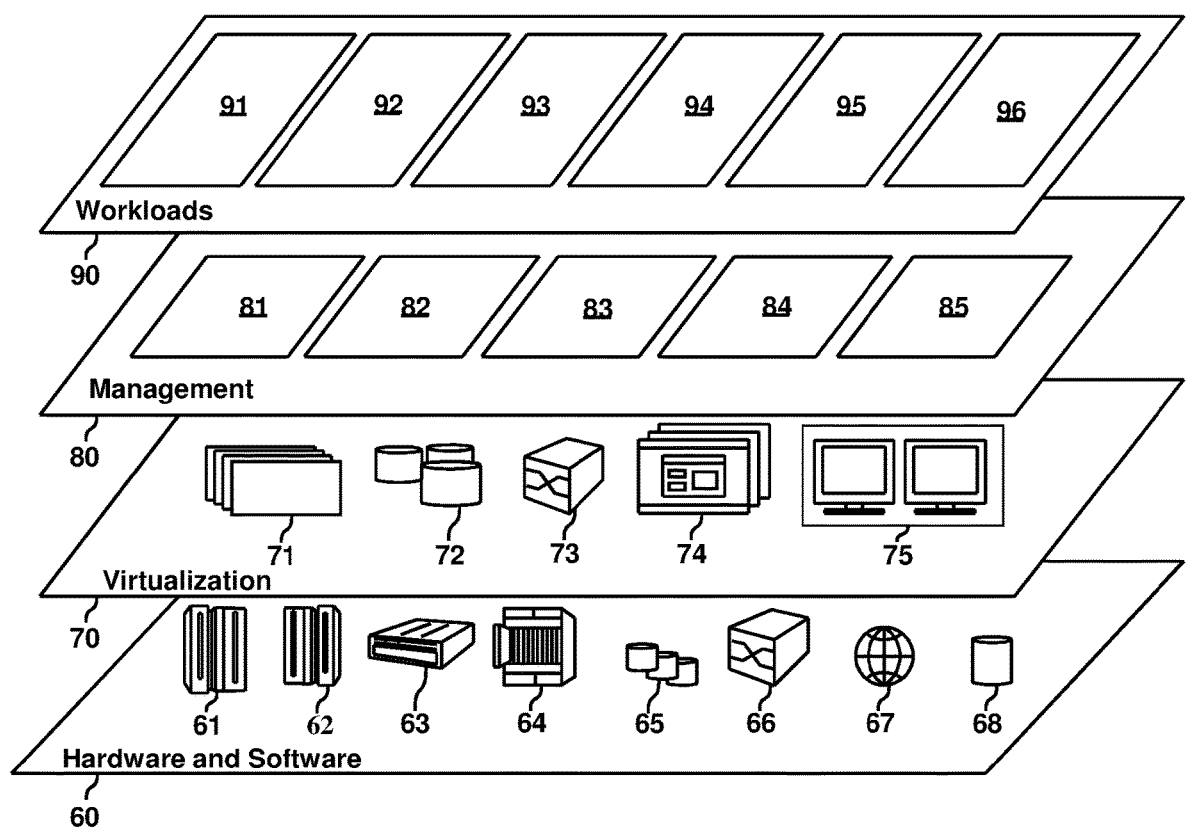
FIG. 2 depicts one embodiment of example abstraction model layers.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Synthetic Transaction Aware Usage Monitoring 82 provides tracking as resources, (such as, but not limited to read/write accesses to a cloud database, bandwidth usage, etc.) are utilized within the cloud computing environment. As discussed in more detail below, the Synthetic Transaction Aware Usage Monitoring 82 is configured to automatically identify authorized synthetic transactions and exclude or filter them from the usage monitoring of traffic. For example, the synthetic transactions can be excluded from metering for billing purposes. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

As discussed above, a cloud computing environment, such as cloud computing environment 50, can provide a plurality of web services via one or more cloud computing nodes with which one or more end user devices communicate. The cloud computing nodes can provide the web services by exposing one or more web Application Programming Interfaces (APIs) which define interfaces through which interactions occur. As understood by one of skill in the art, a web API typically defines a set of request messages and a set of response messages for the communication, such as protocol used and format of the messages. For example, some web APIs utilize Hypertext Transfer Protocol (HTTP) request messages for HTTP operations, such as, but not limited to GET, PUT, POST, and DELETE, and utilize another protocol for response messages, such as, but not limited to, eXtensible Markup Language (XML) or JavaScript Object Notation (JSON). In some embodiments, the web services are implemented using REpresentational State Transfer (REST or RESTful) APIs.

Figure 3:
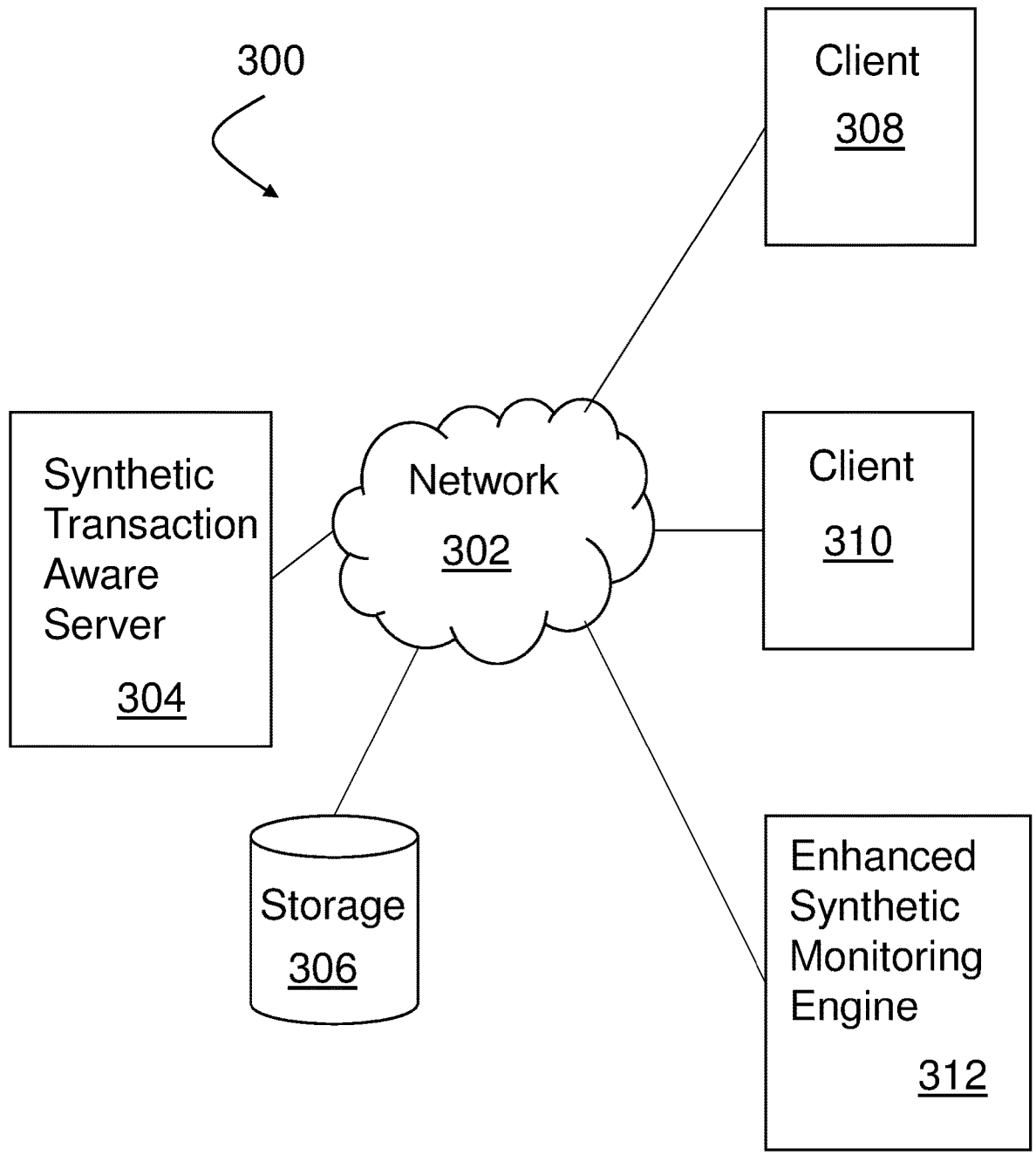
FIG. 3 is a high-level block diagram of another embodiment of a cloud computing environment.

FIG. 3 is a high-level block diagram of another embodiment of a cloud computing environment 300 (also referred to herein as a distributed data processing environment). For purposes of explanation, FIG. 3 is a simplified representation of a cloud computing environment. For example, FIG. 3 depicts only 3 cloud computing nodes (synthetic transaction aware server 304, storage 306, and enhanced synthetic monitoring engine 312) and two clients 308 and 310. However, it is to be understood that, in other embodiments, more or fewer cloud computing nodes and/or more or fewer clients can be utilized.

The clients and cloud computing nodes communicate via network 302. The network 302 can be implemented by any number of any suitable communications topologies (e.g., wide area network (WAN), local area network (LAN), Internet, Intranet, etc.). The communications network 302 can include one or more servers, networks, or databases, and can use a particular communication protocol to transfer data between the user devices or clients (308, 310) and the cloud computing nodes (304, 306, 312) and to transfer data between the cloud computing nodes. The communications network 302 can include a variety of types of physical communication channels or "links." The links can be wired, wireless, optical, or any other suitable media. In addition, the communications network 302 can include a variety of network hardware and software for performing routing, switching, and other functions, such as routers, switches, or bridges. Furthermore, it is to be understood that although clients 308, 310 and cloud computing nodes 312, 306 are depicted in the example of FIG. 3 as being communicatively coupled to the server 304 via the same network 302, for purposes of illustration, the various devices/nodes can be coupled to the synthetic transaction aware server 304 (also referred to herein simply as server 304) via separate networks, in other embodiments. For example, in some embodiments, the enhanced synthetic monitoring engine 312 can be communicatively coupled to the server 304 via a local area network while clients 308 and 310 are communicatively coupled to the server 304 via the internet.

Each of the clients 308, 310 (also referred to herein as user devices or end user devices) can be implemented as a desktop computer, portable computer, laptop or notebook computer, netbook, tablet computer, pocket computer, smart phone, or any other suitable type of electronic device capable of communicating with the server 304 via the network 302. It is to be understood that all of the user devices do not need to be implemented the same. Furthermore, it is to be understood that, although only two user devices are shown for purposes of explanation, more than two user devices can be used in other embodiments. Similarly, although a single server 304 and a single storage device 306 are shown in FIG. 3, more than one server 304 and/or storage device 306 can be implemented in other embodiments. Additionally, it is to be understood that the functionality of server 304 and/or storage device 306 can be distributed across a plurality of devices. For example, the storage device 306 can be implemented as a storage area network comprising a plurality of storage media, as understood by one of skill in the art. The enhanced synthetic monitoring engine 312 can also be implemented, in other embodiments, by distributing functionality across a plurality of devices located in different locations as opposed to using a single device as depicted in FIG. 3

The server 304 provides one or more web services by exposing corresponding APIs, as understood by one of skill in the art. The server 304 also meters usage of the web services, such as tracking the number of requests for access to a web database. Additionally, the server 304 is configured to be aware of synthetic transactions. That is, the server 304 is configured to identify synthetic transactions and to filter the identified synthetic transactions, as discussed in more detail below. Additionally, an example synthetic transaction aware server is discussed in more detail with respect to FIG. 4 and an example enhanced synthetic monitoring engine is discussed in more detail with respect to FIG. 5

As used herein, a synthetic transaction is a request for or use of a networked application that is generated by a monitoring system to appear as a request for use of the networked application by a client device. As used herein, a networked application is an application which is accessible or available over a public or private network. For example, a networked application can be a web service available over a public network, such as the internet. Additionally, in another example, a networked application can be a client/server application available over a private local area network. Regardless of whether the networked application is accessed over a public or private network, the synthetic transactions are used to test the availability of the networked applications, as understood by one of skill in the art. For purposes of explanation only, the following discussion of FIGS. 3-6 is presented with respect to testing availability of a web service accessed over the internet. However, it is to be understood that the following discussion is applicable to any type of networked application accessed/utilized over a public and/or private network. Thus, the embodiments discussed herein enable tests for both public applications as well as internal or private applications without causing inaccurate monitoring statistics due to the authenticated synthetic transactions.

In the example of FIG. 3, the enhanced synthetic monitoring engine 312 is configured to generate and transmit synthetic transactions to the server 304 to test availability of the one or more web services provided by the server 304 using techniques known to one of skill in the art. For example, in some embodiments, the enhanced synthetic monitoring engine 312 can be implemented similar to or as part of the IBM® Bluemix® Availability Monitoring.

In addition to generating and transmitting synthetic transactions to test web services provided by the server 304, the enhanced synthetic monitoring engine is also configured to modify requests sent to the server differently from conventional application monitoring systems in such a way that the server 304 is able to identify and validate the transaction as a synthetic transaction. In particular, the enhanced synthetic monitoring engine 312 is configured to insert a synthetic token corresponding to the web service being tested into a header of each synthetic transaction transmitted to the server 304 for the corresponding web service. In some embodiments, a given synthetic token can correspond to more than one web service. However, in other embodiments, each synthetic token corresponds to a single web service.

In some embodiments in which each synthetic token corresponds to a different respective web service, the synthetic token is generated by the enhanced synthetic monitoring engine based on HTTP endpoint of the corresponding web service. With synthetic HTTP transactions, the enhanced synthetic monitoring engine 312 makes a HTTP request to a HTTP service, such as, but not limited to Cloudant®, Watson®, Twitter®, etc. Since each HTTP service has a different HTTP endpoint (e.g. https://myinstance.cloudant.com or https://api.twitter.com), generating the synthetic token based on the HTTP endpoint ensures that each web service corresponds to a different synthetic token.

By generating a separate synthetic token for each web service, the server 304 is able to validate the synthetic token by comparing it to the endpoint to which the synthetic transaction is directed. In this way, even if a synthetic transaction is received which has a synthetic token, the server 304 will not bypass metering unless the synthetic token corresponds to the web service to which the synthetic transaction is directed. This provides a level of security to avoid an end user attempting to bypass metering for multiple services should one of the synthetic tokens be discovered or obtained by the end user.

In addition, in some embodiments, an added layer of security is provided by configuring the synthetic transaction monitoring engine 312 to encrypt the synthetic token. For example, the server 304 can provide a pre-shared key to the synthetic transaction monitoring engine 312 for use in encrypting the synthetic tokens. The server 304 can decrypt the encrypted synthetic tokens with a private key corresponding to the pre-shared key using techniques known to one of skill in the art. It is to be noted that the pre-shared key is not made publicly available, but rather is shared with select devices. For example, in some embodiments, the server 304 and synthetic transaction monitoring engine 312 are both cloud nodes managed by the same service provider. The server 304, in some such embodiments, communicates the pre-shared key to the synthetic transaction monitoring engine 312, but not to other cloud nodes or clients. In other embodiments, different service providers can collaborate to test each other's service. For example, in such embodiments, the server 304 can be managed by a first service provider and the synthetic transaction monitoring engine 312 can be managed by another service provider. The server 304 can be configured to communicate the pre-shared key to the synthetic transaction monitoring engine 312, based on agreement between the service providers. By limiting dissemination of the pre-shared key, the server 304 decreases the possibility of an end user discovering the value of the synthetic token and using it to bypass metering in an unauthorized manner.

In some embodiments using pre-shared keys, the synthetic transaction monitoring engine 312 is configured to use the same pre-shared key to encrypt synthetic tokens corresponding to different web services. In some such embodiments, the synthetic transaction monitoring engine 312 encrypts the respective HTTP endpoint address of each web service to generate unique synthetic tokens for each respective web service. In other words, the HTTP endpoint address is at least part of the value that is encrypted to generate the respective synthetic token.

The server 304 is configured to analyze the header of each request received and to identify synthetic transactions based on the presence of a synthetic token in an additional field in the header of the request. If the synthetic token is sent in a request header to a server not configured to identify synthetic transactions, such a server will simply ignore the additional field. However, the server 304 is configured to identify synthetic transactions based on the presence of the synthetic token. The server 304 then decrypts the token, if encrypted, and compares the decrypted value to the web service to which the synthetic transaction is directed (e.g. to the HTTP endpoint of the web service). If the decrypted value of the synthetic token does not correspond to the web service, then the server 304 is configured to reject the synthetic transaction. If the decrypted value of the synthetic token corresponds to the web service to which it is directed, then the server 304 filters the synthetic transaction and processes the request of the synthetic transaction. As used herein, filtering or excluding the synthetic transaction refers to not counting the synthetic transaction as part of monitored usage statistics.

As discussed above, using the HTTP endpoint address as part of the synthetic token enables different synthetic tokens to be generated for each web service. In addition, the use of the HTTP endpoint address simplifies the process for the server 304 to verify that the synthetic token corresponds to the web service to which the synthetic transaction is directed. In particular, the server 304 does not need to maintain a list of correspondences between web services and synthetic tokens, but can compare the HTTP endpoint of the desired web service to the decrypted value of the synthetic token to verify that the synthetic token corresponds to the desired web service.

Furthermore, in some embodiments, multiple pre-shared keys are communicated from the server 304 to the synthetic transaction monitoring engine 312 as opposed to a single pre-shared key. In some such embodiments, a different pre-shared key is used for each web service. In this way, the server 304 can verify that the synthetic transaction corresponds to the web service to which it is directed if the server 304 is able to decrypt an agreed upon value using the private key corresponding to the web service and the pre-shared key for the given web service. For example, in some embodiments, a single value is used for all web services. In such embodiments, the server compares the decrypted value to the agreed upon value using the respective private key for the given web service. If the correct pre-shared key was used, then the decrypted value will correspond to the agreed upon value and the server 304 verifies that this is an authorized synthetic transaction for the given web service. However, if the wrong value was used for the synthetic token or the wrong pre-shared key was used for the given web service to which the synthetic transaction is directed, then the decrypted value will not match the agreed upon value and the sever 304 rejects the synthetic transaction.

In other such embodiments, the agreed upon value is the HTTP endpoint address of the corresponding web service and the server 304 uses the private key corresponding to the web service to which the synthetic transaction is directed to decrypt the synthetic token. After decrypting the synthetic token, the server 304 compares the decrypted value to the HTTP endpoint address. If the wrong pre-shared key is used to encrypt the value of the synthetic token, then the server 304 will not be able to properly decrypt the synthetic token and, therefore, determine that the synthetic token does not correspond with the web service and/or is not an authorized synthetic transaction.

Thus, the operations discussed above, the server 304 and enhanced synthetic transaction monitoring engine 312 enable monitoring the availability of applications/web services provided by the server 304 without causing erroneous or inaccurate usage statistics, as in conventional systems. Such inaccurate usage statistics provided by conventional systems could result in charges or costs due to inclusion of the synthetic transactions in usage metering or provide an inaccurate view of the application usage which is used to determine business plans, for example. Additionally, the operations discussed above enable a simple way for the server 304 to verify that the synthetic token corresponds to the web service to which it is directed while also reducing the possibility that attempted unauthorized use of a synthetic token can successfully bypass usage monitoring, such as attempts to avoid metering charges.

Figure 4:
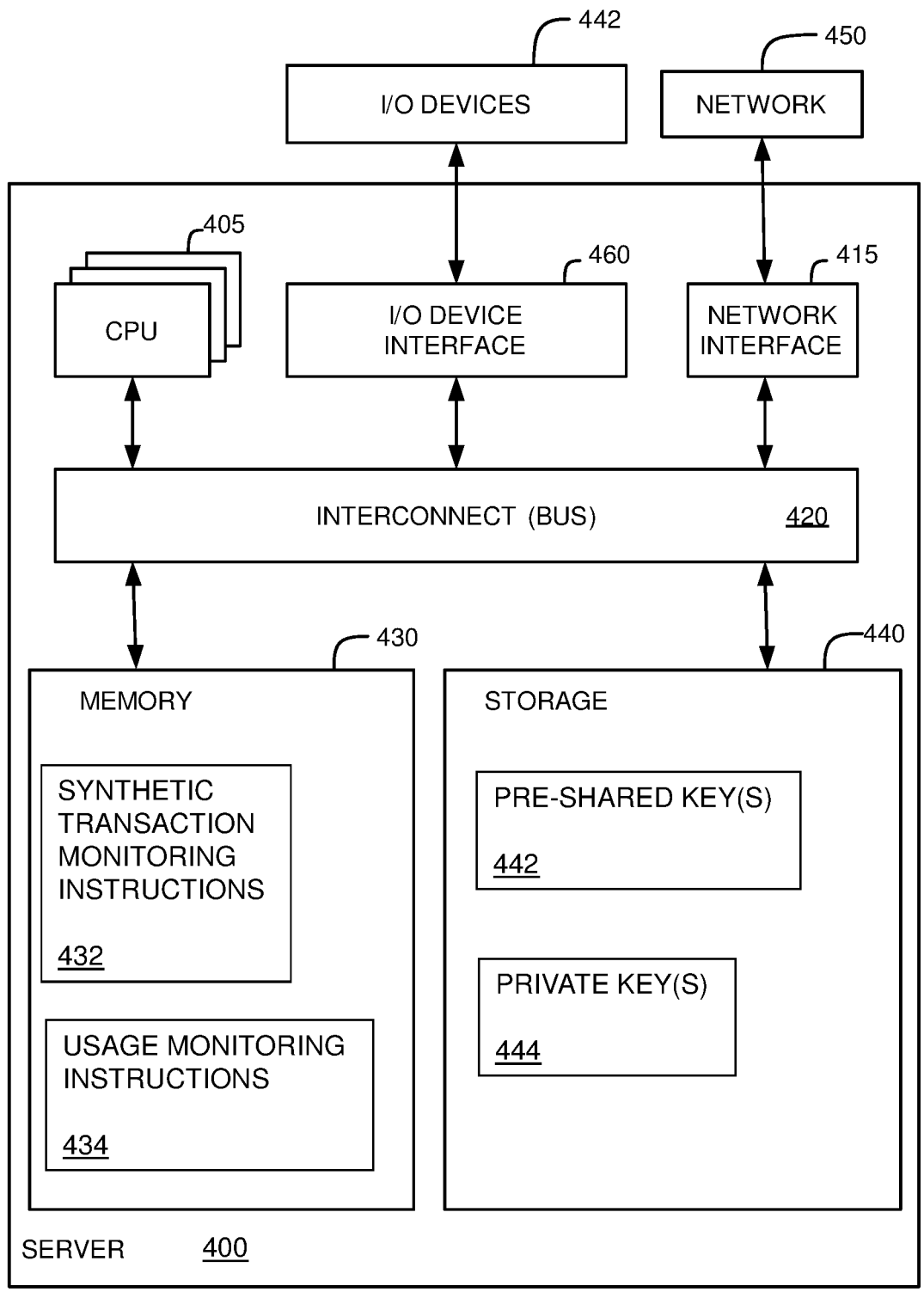
FIG. 4 is a block diagram of one embodiment of an example synthetic transaction aware server.

Referring now to FIG. 4, illustrated is a block diagram of one embodiment of an example synthetic transaction aware server 400 (also referred to herein as server 400). The server 400 can include one or more processors 405 (also referred to herein as CPUs 405), an I/O device interface 410 which can be coupled to one or more I/O devices 412, a network interface 415, an interconnect (e.g., BUS) 420, a memory 430, and a storage 440. In some embodiments, server 400 can be a virtual machine which uses a portion of one or more CPUs 405, a portion of memory 430, and a portion of storage 440 or otherwise shares resources.

In some embodiments, each CPU 405 can retrieve and execute programming instructions stored in the memory 430 or storage 440. The interconnect 420 can be used to move data, such as programming instructions, between the CPUs 405, I/O device interface 410, network interface 415, memory 430, and storage 440. The interconnect 420 can be implemented using one or more busses. Memory 430 is generally included to be representative of a random access memory (e.g., static random access memory (SRAM), dynamic random access memory (DRAM), or Flash). In some embodiments, the memory 430 can be in the form of modules (e.g., dual in-line memory modules).

The storage 440 is generally included to be representative of a non-volatile memory, such as a hard disk drive, solid state device (SSD), removable memory cards, optical storage, or flash memory devices. In an alternative embodiment, the storage 440 can be replaced by storage area-network (SAN) devices, the cloud, or other devices connected to the server 400 via the I/O devices 412 or a network 450 via the network interface 415.

The CPUs 405 can be a single CPU, multiple CPUs, a single CPU having multiple processing cores, or multiple CPUs with one or more of them having multiple processing cores in various embodiments. In some embodiments, a processor 405 can be a digital signal processor (DSP). The CPUs 405 can additionally include one or more memory buffers or caches (not depicted) that provide temporary storage of instructions and data for the CPUs 405. The CPUs 405 can be comprised of one or more circuits configured to perform one or more methods consistent with embodiments of the present disclosure.

The memory 430 of server 400 includes synthetic transaction monitoring instructions 432 and usage monitoring instructions 434. In some embodiments, these instructions individually or together perform one or more operations discussed above with respect to server 304 in FIG. 3. In particular, the usage monitoring instructions 434 cause the CPUs 405 to track usage of one or more web services as discussed above and known to one of skill in the art. The synthetic transaction monitoring instructions 432 cause the CPUs 432 to analyze headers of each request received via interface 415 over network 450 and to identify synthetic transactions from the received requests based on the presence of a synthetic token in the header of the request, as discussed above. The synthetic monitoring instructions 432 further cause the CPUs 432 to decrypt the synthetic token, if applicable, as discussed above and to determine if the synthetic token corresponds to the web service to which it is directed, as discussed above. The usage monitoring instructions 434 cause the CPUs 405 to bypass usage monitoring for the synthetic transaction (e.g. filter the synthetic transaction) when the synthetic token corresponds to the web service to which it is directed.

Storage 440 contains one or more pre-shared keys 442 and one or more corresponding private keys 444. As discussed above, the server 400 can communicate one or more pre-shared keys to a synthetic transaction monitoring engine for use in encrypting synthetic tokens. The CPUs 405 use the corresponding one or more private keys 444 to decrypt received synthetic tokens.

In some embodiments as discussed above, the memory 430 stores synthetic transaction monitoring instructions 432 and usage monitoring instructions 434, and the storage 440 stores one or more pre-shared keys 442 and one or more corresponding private keys 444. However, in various embodiments, each of the synthetic transaction monitoring instructions 432, usage monitoring instructions 434, pre-shared keys 442 and private keys 444 are stored partially in memory 430 and partially in storage 440, or they are stored entirely in memory 430 or entirely in storage 440, or they are accessed over a network 450 via the network interface 415. Furthermore, although synthetic transaction monitoring instructions 432 and usage monitoring instructions 434 are depicted as separate in the example of FIG. 4, it is to be understood that synthetic transaction monitoring instructions 432 and usage monitoring instructions 434 can be combined in a single set of instructions, in other embodiments.

In various embodiments, the I/O devices 412 can include an interface capable of presenting information and receiving input. For example, I/O devices 412 can receive input from an administrator and present information to an administrator and/or a device interacting with server 400.

Logic modules throughout the server 400—including but not limited to the memory 430, the CPUs 405, and the I/O device interface 410—can communicate failures and changes to one or more components to a hypervisor or operating system (not depicted). The hypervisor or the operating system can allocate the various resources available in the server 400 and track the location of data in memory 430 and of processes assigned to various CPUs 405. In embodiments that combine or rearrange elements, aspects and capabilities of the logic modules can be combined or redistributed. These variations would be apparent to one skilled in the art.

Figure 5:
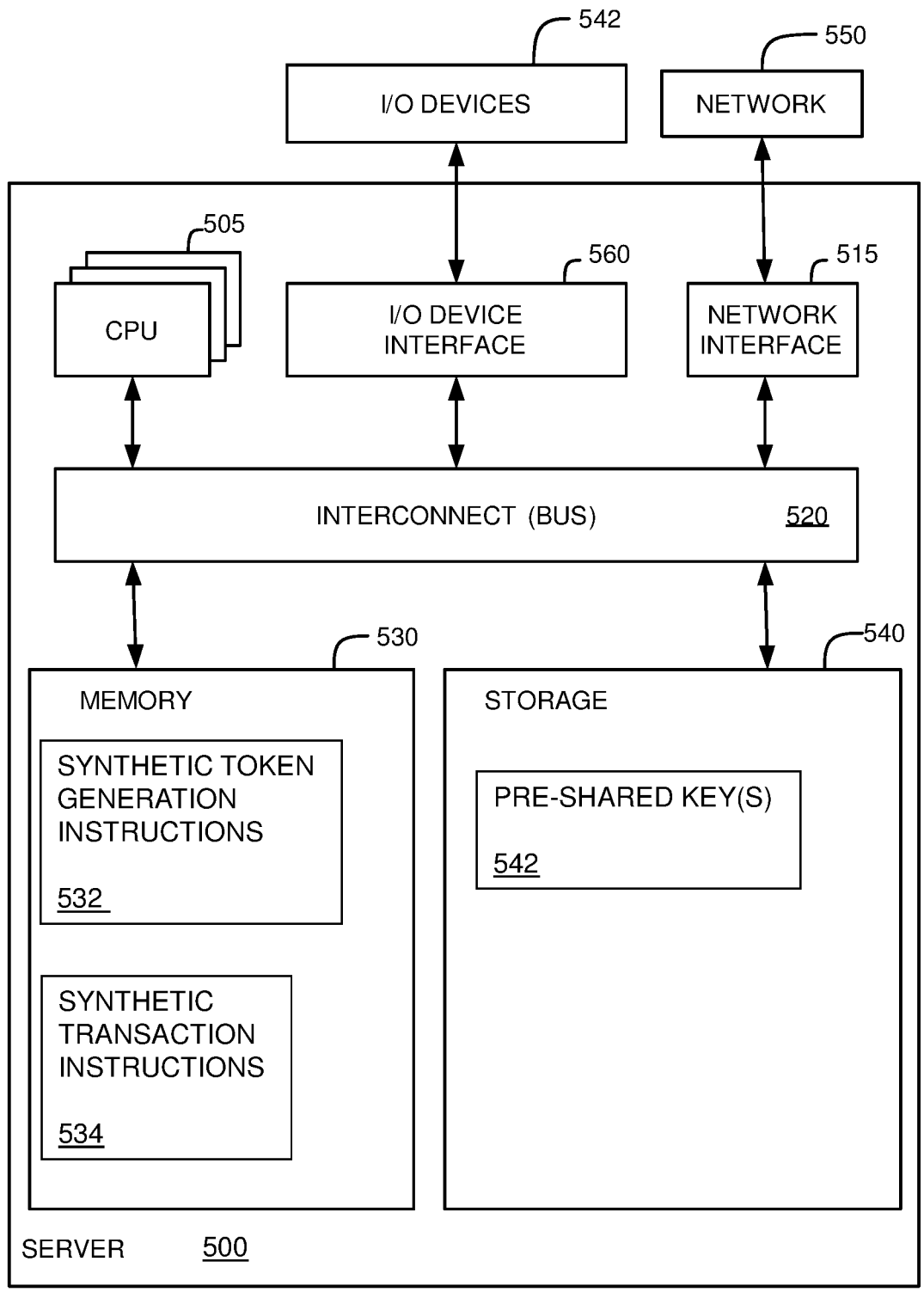
FIG. 5 is a block diagram of one embodiment of an example synthetic transaction monitoring engine.

Referring now to FIG. 5, illustrated is a block diagram of an example synthetic transaction monitoring engine 500, in accordance with some embodiments of the present disclosure. In some embodiments, synthetic transaction monitoring engine 500 performs one or more operations in accordance with FIG. 1 as described above. The synthetic transaction monitoring engine 500 can include one or more processors 505 (also referred to herein as CPUs 505), an I/O device interface 510 which can be coupled to one or more I/O devices 512, a network interface 515, an interconnect (e.g., BUS) 520, a memory 530, and a storage 540. One or more components depicted in FIG. 5 can be combined or replaced by a microcontroller. Such microcontroller can, for example, contain one or more CPUs, memory, and programmable input/output peripherals. In embodiments employing a microcontroller, the discussion of the various components of synthetic transaction monitoring engine 500 can apply instead to corresponding aspects of the microcontroller when applicable. In some embodiments, synthetic transaction monitoring engine 500 can be a virtual machine which uses a portion of one or more CPUs 505, a portion of memory 530, and a portion of storage 540 or otherwise shares resources.

In some embodiments, each CPU 505 can retrieve and execute programming instructions stored in the memory 530 or storage 540. The interconnect 520 can be used to move data, such as programming instructions, between the CPUs 505, I/O device interface 510, network interface 515, memory 530, and storage 540. The interconnect 520 can be implemented using one or more busses. Memory 530 is generally included to be representative of a random access memory (e.g., static random access memory (SRAM), dynamic random access memory (DRAM), or Flash). In some embodiments, the memory 530 can be in the form of modules (e.g., dual in-line memory modules).

The storage 540 is generally included to be representative of a non-volatile memory, such as a hard disk drive, solid state device (SSD), removable memory cards, optical storage, or flash memory devices. In an alternative embodiment, the storage 540 can be replaced by storage area-network (SAN) devices, the cloud, or other devices connected to the synthetic transaction monitoring engine 500 via the I/O devices 512 or a network 550 via the network interface 515.

The CPUs 505 can be a single CPU, multiple CPUs, a single CPU having multiple processing cores, or multiple CPUs with one or more of them having multiple processing cores in various embodiments. In some embodiments, a processor 505 can be a digital signal processor (DSP). The CPUs 505 can additionally include one or more memory buffers or caches (not depicted) that provide temporary storage of instructions and data for the CPUs 505. The CPUs 505 can be comprised of one or more circuits configured to perform one or more methods consistent with embodiments of the present disclosure.

The memory 530 of synthetic transaction monitoring engine 500 includes synthetic token generation instructions 532 and synthetic transaction instructions 534. Synthetic token generation instructions 532 can be an application running in memory 530 which causes the CPUs 505 to generate a synthetic token for a specific web service. In particular, as discussed above, the synthetic token generation instructions 532 can be configured to cause the CPUs 505 to use a pre-shared key received from a synthetic transaction aware server, such as server 304, and stored in memory 540 to generate the synthetic token for the specific web service. The synthetic transaction instructions 534 are configured to cause the CPUs 505 to generate a synthetic transaction and communicate the synthetic transaction to a server providing a web service corresponding to the synthetic transaction, as known to one of skill in the art. Additionally, the synthetic transaction instructions 534 are further configured to cause the CPUs to insert the generated synthetic token into a header of the synthetic transaction such that a synthetic transaction aware server is able to identify and verify the synthetic token and bypass inclusion of the synthetic transaction in usage monitoring for the web service.

In some embodiments as discussed above, the memory 530 stores synthetic token generation instructions 532 and synthetic transaction instructions 534, and the storage 540 stores one or more pre-shared keys 542. However, in various embodiments, each of the synthetic token generation instructions 532, synthetic transaction instructions 534, and the one or more pre-shared keys 542 are stored partially in memory 530 and partially in storage 540, or they are stored entirely in memory 530 or entirely in storage 540, or they are accessed over a network 550 via the network interface 515.

In various embodiments, the I/O devices 512 can include an interface capable of presenting information and receiving input. For example, I/O devices 512 can receive input from a user and present information to a user and/or a device interacting with synthetic transaction monitoring engine 500.

Logic modules throughout the synthetic transaction monitoring engine 500—including but not limited to the memory 530, the CPUs 505, and the I/O device interface 510—can communicate failures and changes to one or more components to a hypervisor or operating system (not depicted). The hypervisor or the operating system can allocate the various resources available in the synthetic transaction monitoring engine 500 and track the location of data in memory 530 and of processes assigned to various CPUs 505. In embodiments that combine or rearrange elements, aspects and capabilities of the logic modules can be combined or redistributed. These variations would be apparent to one skilled in the art.

Figure 6:
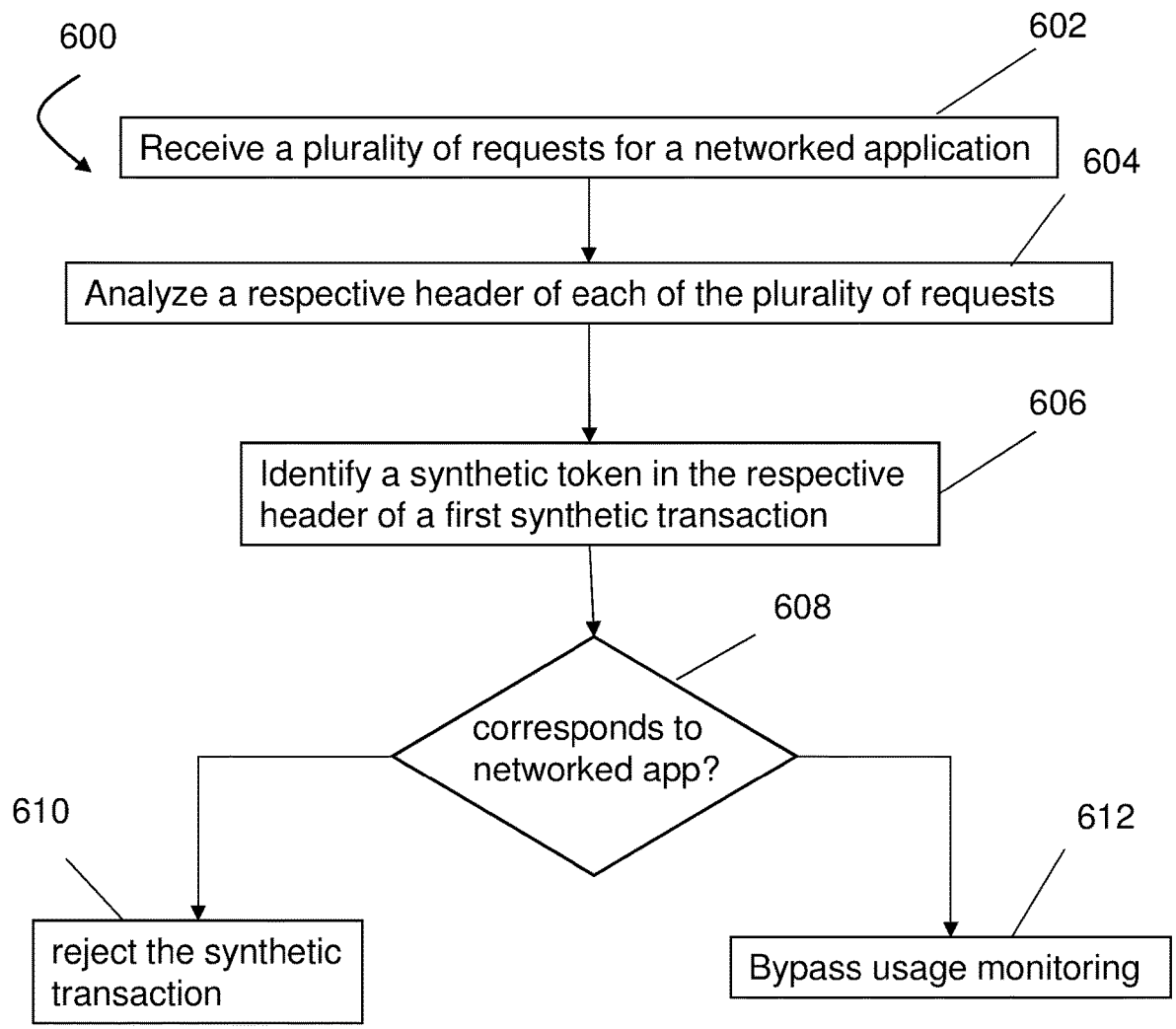
FIG. 6 is a flow chart depicting one embodiment of an example method of filtering authenticated synthetic transactions.

FIG. 6 is a flow chart depicting one embodiment of an example method 600 of filtering authenticated synthetic transactions to bypass usage monitoring. The method 600 can be implemented by a synthetic transaction aware server, such as server 304 and server 400 discussed above. For example, the method 600 can be implemented by a CPU, such as CPU 405 in server 400, executing instructions, such as synthetic transaction monitoring instructions 432 and usage monitoring instructions 434. It is to be understood that the order of actions in example method 600 is provided for purposes of explanation and that the method can be performed in a different order in other embodiments. Similarly, it is to be understood that some actions can be omitted or additional actions can be included in other embodiments.

At block 602, a plurality of requests for a networked application, such as a web service, are received at a server providing the web service. The plurality of received requests includes a first synthetic transaction. At block 604, a respective header of each of the plurality of requests is analyzed by the server. Analyzing the header of each request can include, but is not limited to, identifying a requested operation to be performed in each request and an endpoint address of the request. At block 606, a synthetic token in the respective header of the first synthetic transaction is identified in response to or as a result of analyzing the respective header of each of the plurality of requests. For example, the synthetic token can be identified as discussed above as a field in a header of an HTTP request.

At block 608, the server determines whether the identified synthetic token corresponds to the web service. For example, as discussed above, the synthetic token can be based at least in part on the HTTP endpoint address and determining whether the identified synthetic token corresponds to the web service to which it is directed comprises comparing the synthetic token to the destination address of the synthetic transaction request. Furthermore, as discussed above, in some embodiments, the synthetic token is encrypted, such as via use of a pre-shared key communicated by the server to the synthetic transaction monitoring engine which transmitted the synthetic transaction to the server. As discussed above, in some embodiments, the same pre-shared key is used for a plurality of synthetic tokens, each synthetic token corresponding to a different web service. In other embodiments, a different pre-shared key can be used for the synthetic tokens of each respective web service. When the synthetic token is encrypted, determining whether the identified synthetic token corresponds to the web service to which the synthetic transaction is directed comprises decrypting the synthetic token, as discussed above.

If it is determined, at block 608, that the synthetic token does not correspond to the web service to which the synthetic transaction is directed, then the server rejects the synthetic transaction at block 610. That is, the server does not execute the requested operation from the synthetic transaction. If it is determined, at block 608, that the synthetic token does correspond to the web service to which the synthetic transaction is directed, then the server executes the requested operation and bypasses usage monitoring for the synthetic transaction at block 612, as discussed above. As understood by one of skill in the art, executing the requested operation can include providing a response to the synthetic transaction monitoring engine so that the synthetic transaction monitoring engine can determine the availability of the service. Additionally, as discussed above, bypassing usage monitoring can include not increasing a count of operations performed if the usage is measured in number of operations performed; not including the bandwidth utilized to execute the operation if the usage is measured in bandwidth used, etc.

Thus, as discussed above, the method 600 enables the use of synthetic transaction to determine availability of a service without increasing usage statistics due to the synthetic transactions. By enabling this advantage, performance of the system can be improved as a result of more systems implementing service availability monitoring. For example, some users may be not make use of service availability monitoring if such use causes additional incurred costs based on inaccurate usage statistics due to the synthetic transactions. Furthermore, by enabling the server to verify synthetic transactions and reject those not validated for the given web service, additional processing resources of the server can be reserved for valid synthetic transactions and client requests as opposed to executing all requests which can include some improper or unauthorized synthetic transactions having synthetic tokens which do not correspond with the service to which they are directed.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A computer-implemented method comprising:
   receiving over a network, at a server providing a first networked application, a plurality of requests for the first networked application, wherein the plurality of requests includes a first synthetic transaction;
   analyzing, via the server, a respective header of each of the plurality of requests;
   identifying, via the server, a synthetic token in the respective header of the first synthetic transaction in response to analyzing the respective header of each of the plurality of requests;
   determining, via the server, that the identified synthetic token corresponds to the first networked application; and
   bypassing, via the server, usage monitoring for the first synthetic transaction in response to determining that the identified synthetic token corresponds to the first networked application.

2. The computer-implemented method of claim 1, wherein the identified synthetic token is generated based on a Hypertext Transfer Protocol (HTTP) endpoint address of the first networked application.

3. The computer-implemented method of claim 1, wherein the first networked application is a web service implemented using a REpresentational State Transfer (RESTful) Application Programming Interface (API); and
   wherein the first synthetic transaction comprises an HTTP request.

4. The computer-implemented method of claim 1, further comprising:
   receiving, at the server, a second synthetic transaction directed to the first networked application;
   analyzing, via the server, a header of the second synthetic transaction;
   identifying, via the server, a second synthetic token in the header of the second synthetic transaction in response to analyzing the header of the second synthetic transaction;
   determining, via the server, that the second identified synthetic token does not correspond to the first networked application; and
   rejecting, via the server, the second synthetic transaction in response to determining that the second identified synthetic token does not correspond to the first networked application.

5. The computer-implemented method of claim 1, wherein the synthetic token is encrypted using a pre-shared key provided by the server to a synthetic transaction monitoring engine prior to generation of the first synthetic transaction by the synthetic transaction monitoring engine; and
   wherein determining whether the identified synthetic token corresponds to the first networked application includes decrypting the synthetic token using a private key corresponding to the pre-shared key.

6. The computer-implemented method of claim 5, wherein the first networked application is one of a plurality of networked applications provided by the server and the first synthetic transaction is one of a plurality of synthetic transactions, each of the plurality of synthetic transactions directed to a respective one of the plurality of networked applications;
   wherein each of the plurality of synthetic transactions includes a respective synthetic token, each of the synthetic tokens including a same first value encrypted by a different pre-shared key of a plurality of pre-shared keys provided by the server, each of the plurality of pre-shared keys corresponding to a respective one of the plurality of networked applications and to a respective private key;
   wherein determining that the identified synthetic token in the first synthetic transaction corresponds to the first networked application comprises decrypting the identified synthetic token in the first synthetic transaction using the respective private key corresponding to the first networked application to obtain a decrypted value and comparing the decrypted value to the first value.

7. The computer-implemented method of claim 5, wherein the first networked application is one of a plurality of networked applications provided by the server and the first synthetic transaction is one of a plurality of synthetic transactions, each of the plurality of synthetic transactions directed to a respective one of the plurality of networked applications;
   wherein each of the plurality of synthetic transactions includes a respective synthetic token, each of the synthetic tokens including a different respective value chosen based on the respective networked application, each of the synthetic tokens encrypted by a same pre-shared key provided by the server, the same pre-shared key corresponding to a private key;
   wherein determining that the identified synthetic token in the first synthetic transaction corresponds to the first networked application comprises decrypting the identified synthetic token in the first synthetic transaction using the private key to obtain a decrypted value and comparing the decrypted value to the respective value chosen based on the first networked application.

8. The computer-implemented method of claim 5, wherein the first networked application is one of a plurality of networked applications provided by the server and the first synthetic transaction is one of a plurality of synthetic transactions, each of the plurality of synthetic transactions directed to a respective one of the plurality of networked applications;
   wherein each of the plurality of synthetic transactions includes a respective synthetic token, each of the synthetic tokens including a different respective value chosen based on the respective networked application, each of the synthetic tokens encrypted by a different pre-shared key of a plurality of pre-shared keys provided by the server, each of the plurality of pre-shared keys corresponding to a respective one of the plurality of networked applications and to a respective private key;

wherein determining that the identified synthetic token in the first synthetic transaction corresponds to the first networked application comprises decrypting the identified synthetic token in the first synthetic transaction using the respective private key corresponding to the first networked application to obtain a decrypted value and comparing the decrypted value to the respective value chosen based on the first networked application.

9. A server configured to provide a first networked application, the server comprising:
a network interface configured to receive a plurality of requests for the first networked application, wherein the plurality of requests includes a first synthetic transaction; and
a processor communicatively coupled to the network interface and configured to:
identify the first synthetic transaction based on a first synthetic token in a header of the first synthetic transaction;
compare the first synthetic token to a pre-determined value for the first networked application; and
exclude the first synthetic transaction from usage monitoring in response to determining that the first synthetic token corresponds to the pre-determined value for the first networked application.

10. The server of claim 9, wherein the first synthetic token is generated based on a Hypertext Transfer Protocol (HTTP) endpoint address of the first networked application.

11. The server of claim 9, wherein the processor is further configured to:
analyze a header of a second synthetic transaction received via the network interface, the second synthetic transaction directed to the first networked application;
identify a second synthetic token in the header of the second synthetic transaction in response to analyzing the header of the second synthetic transaction;
determine that the second synthetic token does not correspond to the first networked application; and
reject the second synthetic transaction in response to determining that the second synthetic token does not correspond to the first networked application.

12. The server of claim 9, wherein the first synthetic token is encrypted using a pre-shared key provided by the processor to a synthetic transaction monitoring engine via the network interface prior to generation of the first synthetic transaction by the synthetic transaction monitoring engine; and
wherein to compare the first synthetic token to the pre-determined value the processor is further configured to decrypt the first synthetic token using a private key corresponding to the pre-shared key.

13. The server of claim 12, wherein the first networked application is one of a plurality of networked applications provided by the server and the first synthetic transaction is one of a plurality of synthetic transactions, each of the plurality of synthetic transactions directed to a respective one of the plurality of networked applications;
wherein each of the plurality of synthetic transactions includes a respective synthetic token, each of the synthetic tokens including a same first pre-determined value encrypted by a different pre-shared key of a plurality of pre-shared keys provided by the processor, each of the plurality of pre-shared keys corresponding to a respective one of the plurality of networked applications and to a respective private key;
wherein to compare the first synthetic token to the pre-determined value the processor is further configured to decrypt the first synthetic token in the first synthetic transaction using the respective private key corresponding to the first networked application to obtain a decrypted value and to compare the decrypted value to the same first pre-determined value.

14. The server of claim 12, wherein the first networked application is one of a plurality of networked applications provided by the server and the first synthetic transaction is one of a plurality of synthetic transactions, each of the plurality of synthetic transactions directed to a respective one of the plurality of networked applications;
wherein each of the plurality of synthetic transactions includes a respective synthetic token, each of the synthetic tokens including a different respective value chosen based on the respective networked application, each of the synthetic tokens encrypted by a same pre-shared key provided by the processor, the same pre-shared key corresponding to a private key;
wherein to compare the first synthetic token to the pre-determined value the processor is further configured to decrypt the first synthetic token in the first synthetic transaction using the private key to obtain a decrypted value and to compare the decrypted value to the respective value chosen based on the first networked application.

15. A computer program product comprising a computer readable storage medium having a computer readable program stored therein, wherein the computer readable program, when executed by a processor, causes the processor to:
receive a plurality of requests for a first networked application, wherein the plurality of requests includes a first synthetic transaction;
analyzing a respective header of each of the plurality of requests;
identify a first synthetic token in the respective header of the first synthetic transaction in response to analyzing the respective header of each of the plurality of requests;
compare the first synthetic token to a pre-determined value for the first networked application; and
filter the first synthetic transaction to bypass usage monitoring in response to determining that the first synthetic token corresponds to the pre-determined value for the first networked application.

16. The computer program product of claim 15, wherein the first synthetic token is generated based on a Hypertext Transfer Protocol (HTTP) endpoint address of the first networked application.

17. The computer program product of claim 15, wherein the computer readable program is further configured to cause the processor to:
analyze a header of a second synthetic transaction received via the network interface, the second synthetic transaction directed to the first networked application;
identify a second synthetic token in the header of the second synthetic transaction in response to analyzing the header of the second synthetic transaction;
determine that the second synthetic token does not correspond to the first networked application; and reject the second synthetic transaction in response to determining that the second synthetic token does not correspond to the first networked application.

18. The computer program product of claim 15, wherein the first synthetic token is encrypted using a pre-shared key provided to a synthetic transaction monitoring engine prior to generation of the first synthetic transaction by the synthetic transaction monitoring engine; and wherein the computer readable program is further configured to cause the processor to compare the first synthetic token to the pre-determined value by decrypting the first synthetic token using a private key corresponding to the pre-shared key.

19. The computer program product of claim 18, wherein the first networked application is one of a plurality of networked applications and the first synthetic transaction is one of a plurality of synthetic transactions, each of the plurality of synthetic transactions directed to a respective one of the plurality of networked applications;

wherein each of the plurality of synthetic transactions includes a respective synthetic token, each of the synthetic tokens including a same first pre-determined value encrypted by a different pre-shared key of a plurality of pre-shared keys provided by the processor, each of the plurality of pre-shared keys corresponding to a respective one of the plurality of networked applications and to a respective private key;

wherein the computer readable program is further configured to cause the processor to compare the first synthetic token to the pre-determined value by decrypting the first synthetic token in the first synthetic transaction using the respective private key corresponding to the first networked application to obtain a decrypted value and comparing the decrypted value to the same first pre-determined value.

20. The computer program product of claim 18, wherein the first networked application is one of a plurality of networked applications provided by the server and the first synthetic transaction is one of a plurality of synthetic transactions, each of the plurality of synthetic transactions directed to a respective one of the plurality of networked applications;

wherein each of the plurality of synthetic transactions includes a respective synthetic token, each of the synthetic tokens including a different respective value chosen based on the respective networked application, each of the synthetic tokens encrypted by a same pre-shared key provided by the processor, the same pre-shared key corresponding to a private key;

wherein the computer readable program is further configured to cause the processor to compare the first synthetic token to the pre-determined value by decrypting the first synthetic token in the first synthetic transaction using the private key to obtain a decrypted value and comparing the decrypted value to the respective value chosen based on the first networked application.

* * * * *